(12) United States Patent
Wu

(10) Patent No.: US 6,622,587 B1
(45) Date of Patent: Sep. 23, 2003

(54) WHEELED WALKER BRAKE LEVER MOUNTING ARRANGEMENT

(76) Inventor: David Wu, No. 35-1, Jih-Hsin Street, Tu Cheng City, Taipei Hsien (TW)

( * ) Notice: Subject to any disclaimer, the term of this patent is extended or adjusted under 35 U.S.C. 154(b) by 1 day.

(21) Appl. No.: 10/067,340

(22) Filed: Feb. 7, 2002

(51) Int. Cl.[7] ............................................. F16C 1/10
(52) U.S. Cl. ..................................... 74/502.2; 74/489
(58) Field of Search .............................. 74/489, 501.6, 74/502.2, 526, 529

(56) References Cited

U.S. PATENT DOCUMENTS

| | | | | |
|---|---|---|---|---|
| 5,664,460 A | * | 9/1997 | Hewson | 74/502.2 |
| 5,878,625 A | * | 3/1999 | Hu | 74/502.2 |
| 6,079,290 A | * | 6/2000 | Li | 74/502.2 |
| 6,192,772 B1 | * | 2/2001 | Huang | 74/502.2 |
| 6,202,502 B1 | * | 3/2001 | Chung-Che | 74/502.2 |
| 6,216,825 B1 | * | 4/2001 | Hung | 74/489 |

* cited by examiner

*Primary Examiner*—William C Joyce
*Assistant Examiner*—Timothy McAnulty
(74) *Attorney, Agent, or Firm*—Varndell & Varndell, PLLC

(57) ABSTRACT

A wheeled walker brake lever mounting arrangement is constructed to include a mounting base frame fixedly fastened to one handlebar of a wheeled walker, a brake cable inserted through the mounting base frame and connected to a brake assembly at rear wheels of the wheeled walker, and a brake lever coupled to the mounting base frame by a slip joint and connected to the brake lever and turned relative to the mounting base frame between a first position where the brake lever is firmly secured in position to pull up the brake cable and to hold the brake cable in the braking position, a second (the neutral) position where the brake lever is loosened, and a third position where the brake lever holds the brake cable temporarily in the braking position.

2 Claims, 8 Drawing Sheets

WHEELED WALKER BRAKE LEVER MOUNTING ARRANGEMENT

BACKGROUND AND SUMMARY OF THE INVENTION

The present invention relates to a wheeled walker and, more specifically, to a wheeled walker brake lever mounting arrangement, which is easy to install and stable in operation.

FIG. 1 illustrates a conventional wheeled walker 5. When the user pulls the brake levers 511 at the handlebars 51, the brake cables 6 are driven to stop the wheels 54. The handlebars 51 are respectively inserted into the front wheel frame bars 53 and axially adjustably secured thereto at the desired elevation. When the handlebars 51 set in the top limit position, the distance between the handlebars 51 and the axes 541 of the rear wheels 54 is relatively increased. At this time, the wheeled walker 5 may vibrate when user pulls the brake levers 511 to stop the wheeled walker 5 suddenly. Furthermore, the user cannot keep the brake levers 511 in the braking position without holding the brake levers 511 with the hands.

The present invention has been accomplished to provide a wheeled walker brake lever mounting arrangement, which eliminates the aforesaid drawbacks. According to one aspect of the present invention, the wheeled walker brake lever mounting arrangement comprises a mounting base frame fixedly fastened to one handlebar of a wheeled walker, a brake cable inserted through the mounting base frame and connected to a brake assembly at rear wheels of the wheeled walker, and a brake lever coupled to the mounting base frame by a slip joint and connected to the brake lever and turned relative to the mounting base frame between a first position where the brake lever is firmly secured in position to pull up the brake cable and to hold the brake cable in the braking position, a second (the neutral) position where the brake lever is loosened, and a third position where the brake lever holds the brake cable temporarily in the braking position. According to another aspect of the present invention, the wire hole of the mounting base frame through which the brake cable passes extends downwards through the bottom wall of the mounting base frame toward the axis of the corresponding rear wheel of the wheeled walker, so that the wheeled walker does not vibrate when the user pulls up the brake lever to stop the wheeled walker suddenly.

DETAILED DESCRIPTION OF THE PREFERRED EMBODIMENT

Figure 1:
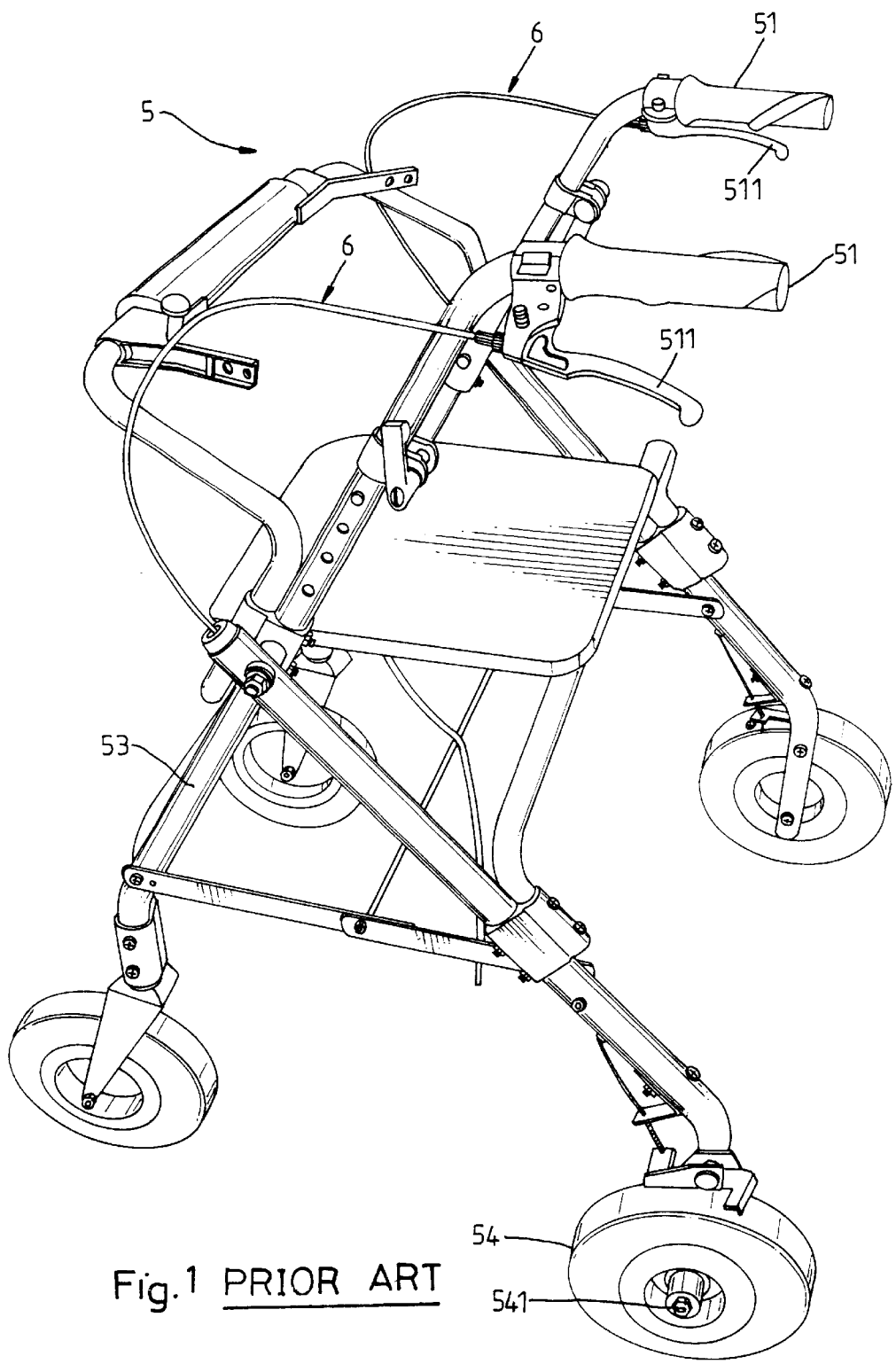
FIG. 1 is a perspective view of a wheeled walker constructed according to the prior art.
Figure 2:
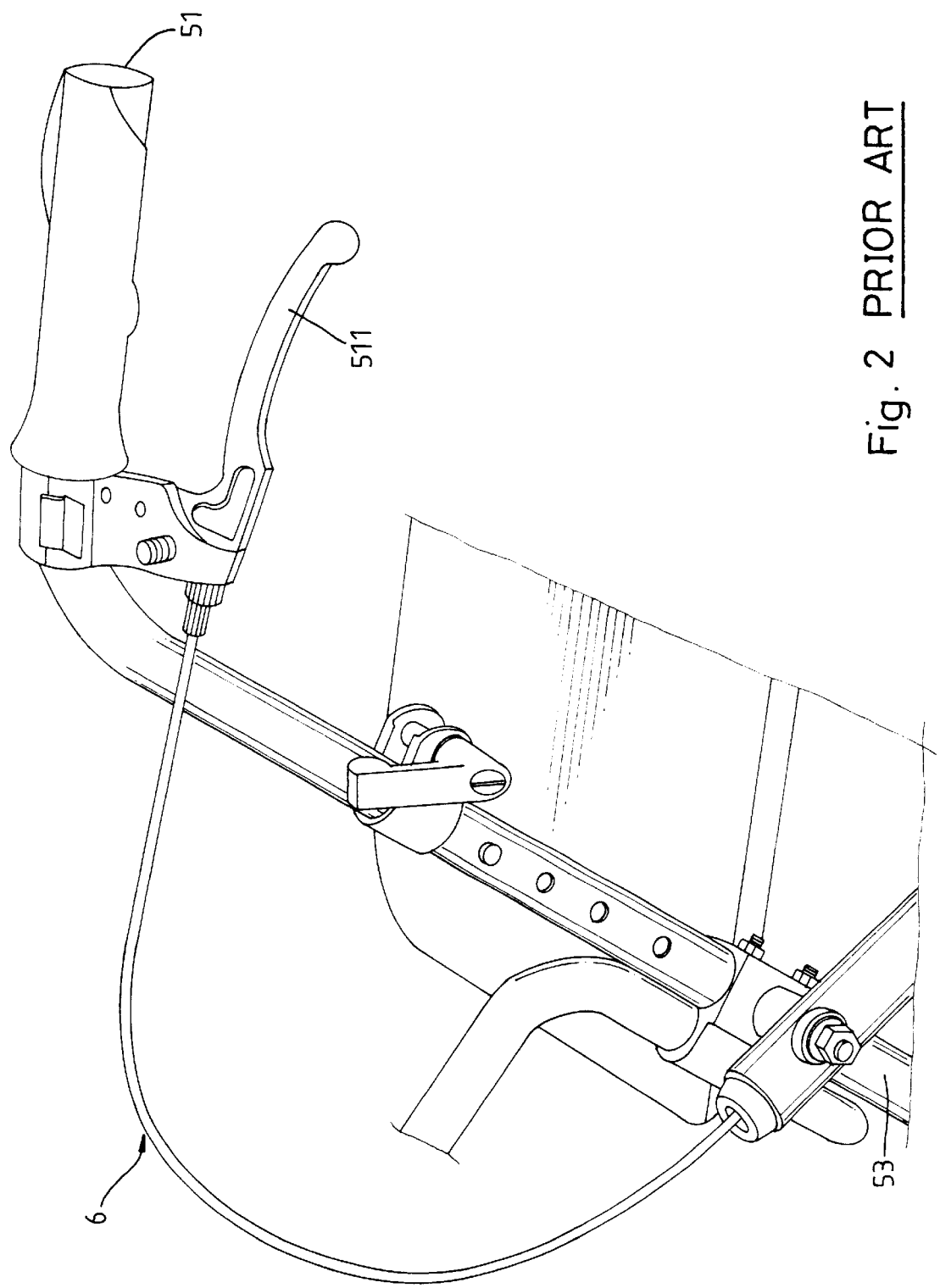
FIG. 2 is an enlarged view of a part of the wheeled walker shown on FIG. 1.
Figure 3:
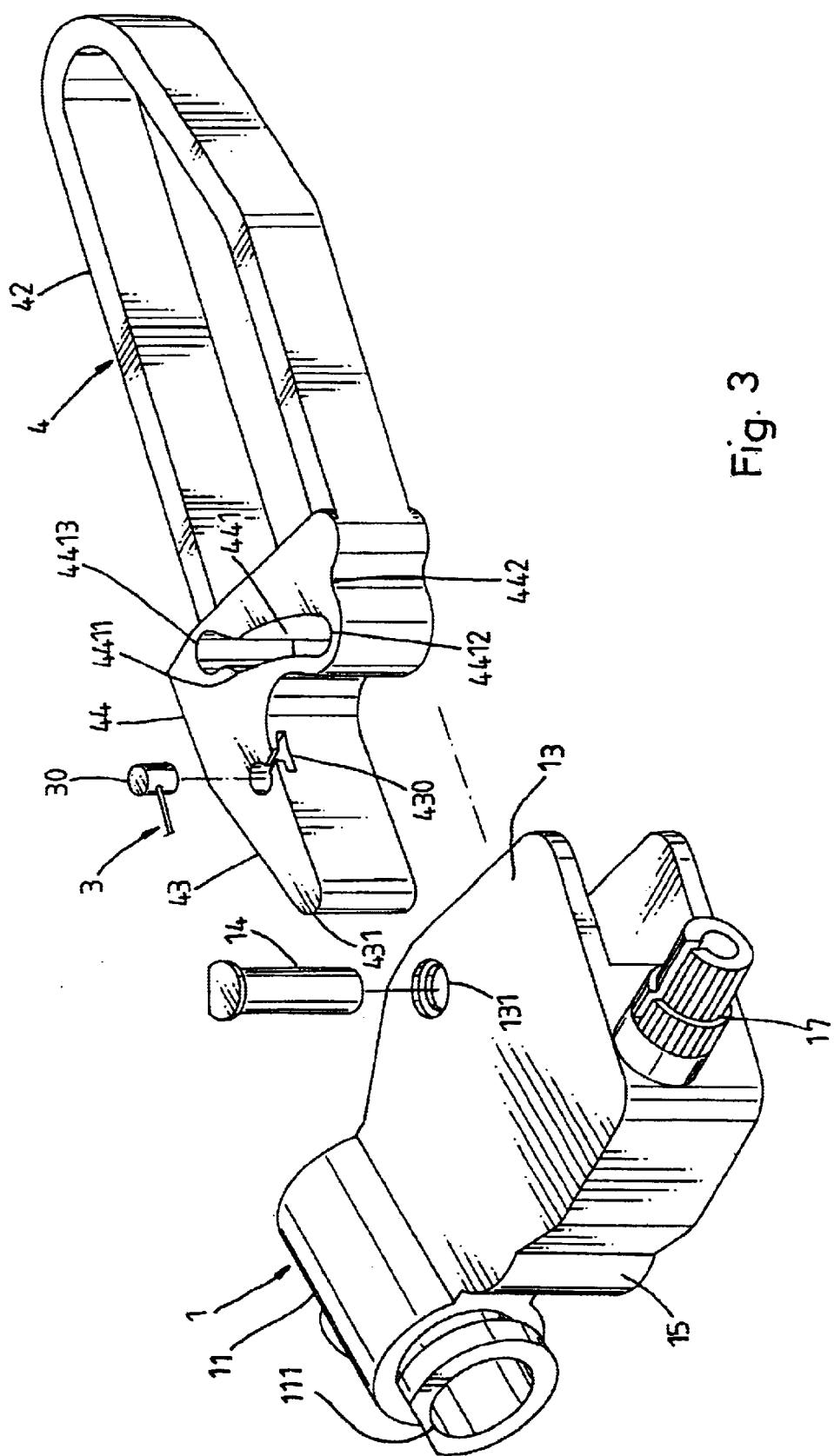
FIG. 3 is an exploded view of a wheeled walker brake lever mounting arrangement according to the present invention.
Figure 4:
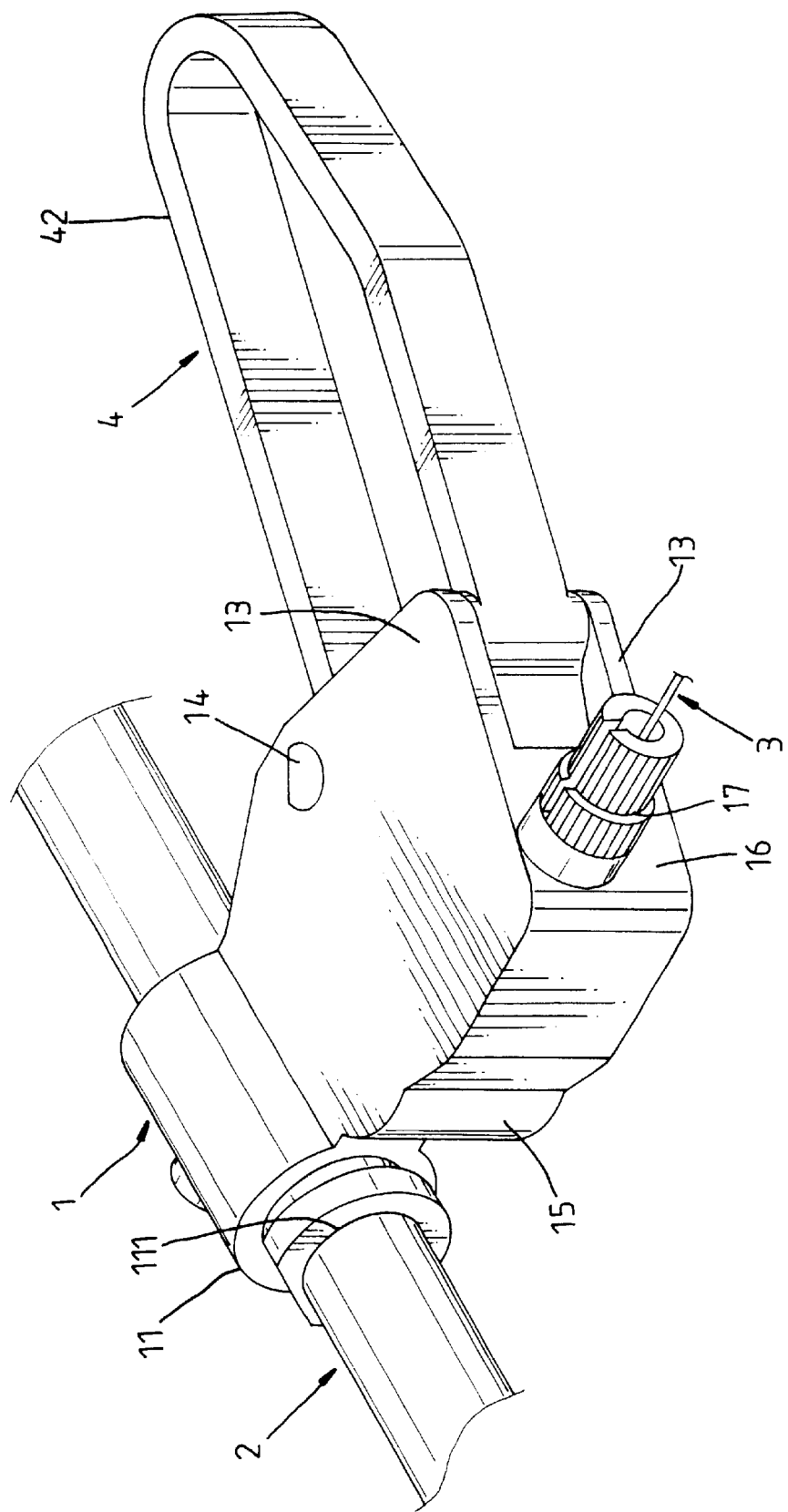
FIG. 4 is an elevational view of the present invention, showing the wheeled walker brake lever mounting arrangement fastened to the handlebar of a wheeled walker.
Figure 5:
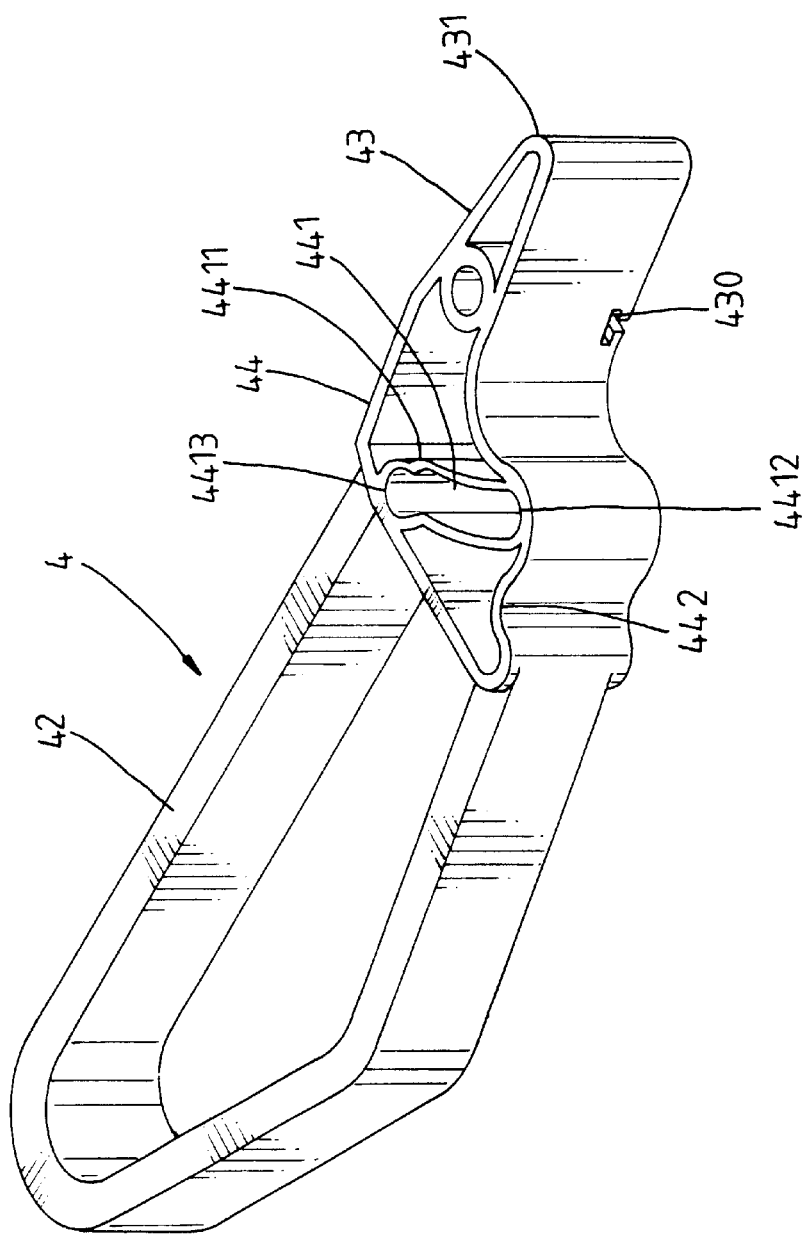
FIG. 5 is an elevational view of the brake lever for the wheeled walker brake lever mounting arrangement according to the present invention.

Referring to FIGS. from 3 through 8, a wheeled walker brake lever mounting arrangement in accordance with the present invention is shown comprised of a mounting base frame 1, a brake cable 3, and a brake lever 4. The mounting base frame 1 comprises a top wall 10, a front wall 15, a bottom wall 16, two sidewalls 13, a barrel 11 integral with the top wall 10, a wire hole 161 extended through the bottom wall 16, and a wire guide 17 mounted in the wire hole 161. The barrel 11 has an axially extended mounting hole 111, which receives the handlebar 2 of the wheeled walker (not shown), and a transverse screw hole 1111, which receives a tightening up screw 112 that fixes the barrel 11 to the handlebar 2. The brake lever 4 is pivoted to the mounting base frame 1 between the sidewalls 13, having a locating hole 430 at the front side thereof and a backwardly extended handhold portion 42 for the holding of the hand. The brake cable 3 is inserted through the wire guide 17 in the wire hole 161, having one end terminating in an end rod 30, which is fastened to the locating hole 430 of the brake lever 4, and the other end fastened to the rear wheel brake assembly (not shown) of the wheeled walker.

The main features of the present invention are outlined hereinafter with reference to FIGS. from 3 through 8 again. The mounting base frame 1 further comprises a stop block 151 inwardly protruded from the inner surface of the front wall 15 and forming a stop face 1511, a recessed positioning portion 152 disposed on the inside between the front wall 15 and the top wall 10, and two pivot holes 131 respectively extended through the sidewalls 13 in alignment with each other. The brake lever 4 further comprises a base block 44, a wedge-shaped front protruding block 43 perpendicularly forwardly protruded from the front side of the base block 44, a recessed positioning portion 442 disposed at the bottom side of the base block 44, an elongated coupling slot 441 through the base block 44, and a positioning groove 4411 transversely disposed in the elongated coupling slot 441 at one side. The elongated coupling slot 441 has a smoothly arched first end 4412 and a smoothly arched second end 4413. The aforesaid handhold portion 42 extends backwards from the backside of the base block 44. The wedge-shaped front protruding block 43 is formed integral with the base block 44. The aforesaid locating hole 430 is formed in the connection area between the wedge-shaped front protruding block 43 and the base block 44. A pivot 14 is mounted in the pivot holes 131 of the sidewalls 13 of the mounting base frame 1 and the elongated coupling slot 441 of the brake lever 4.

Figure 6:
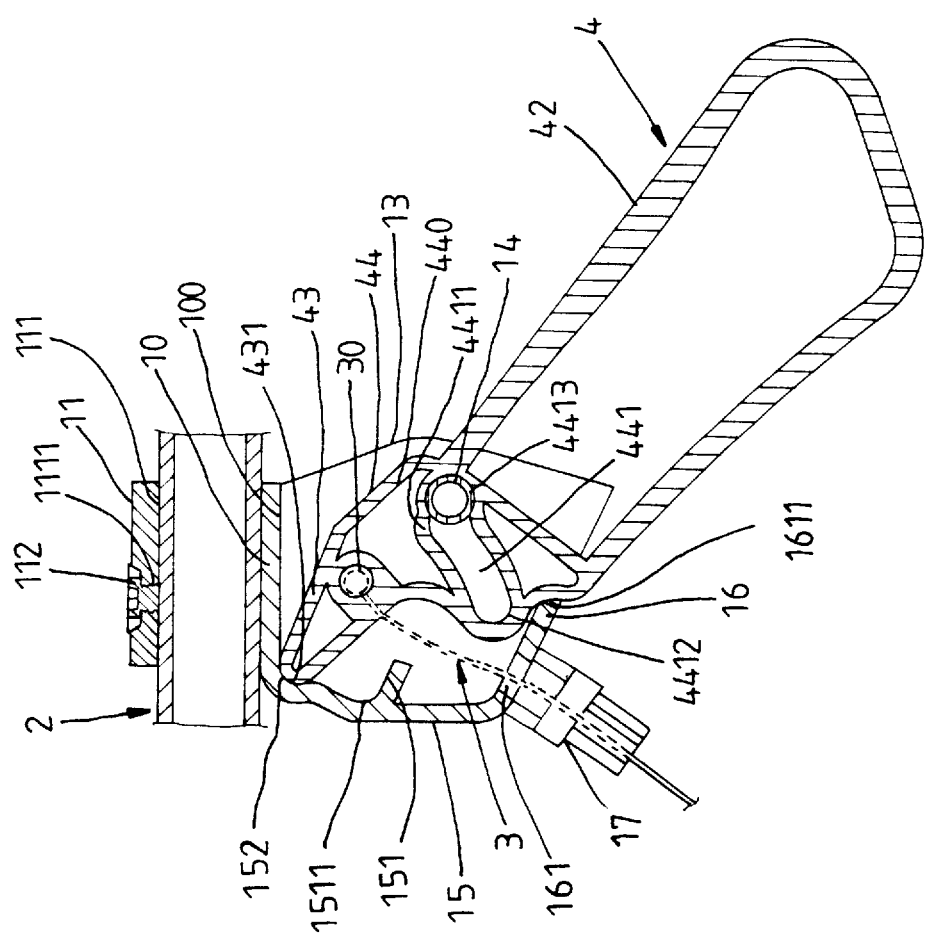
FIG. 6 is a sectional view of the present invention showing the brake lever turned to a first position in the mounting base frame.
Figure 7:
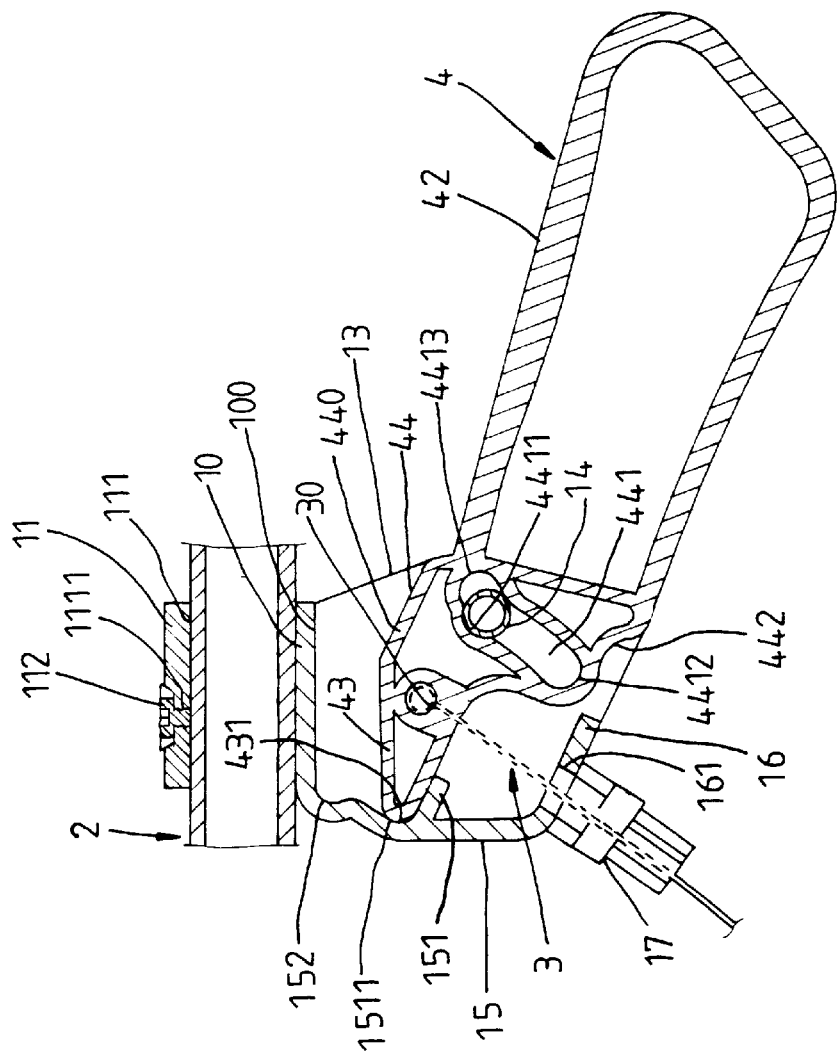
FIG. 7 is a sectional view of the present invention showing the brake lever turned to a second position in the mounting base frame.
Figure 8:
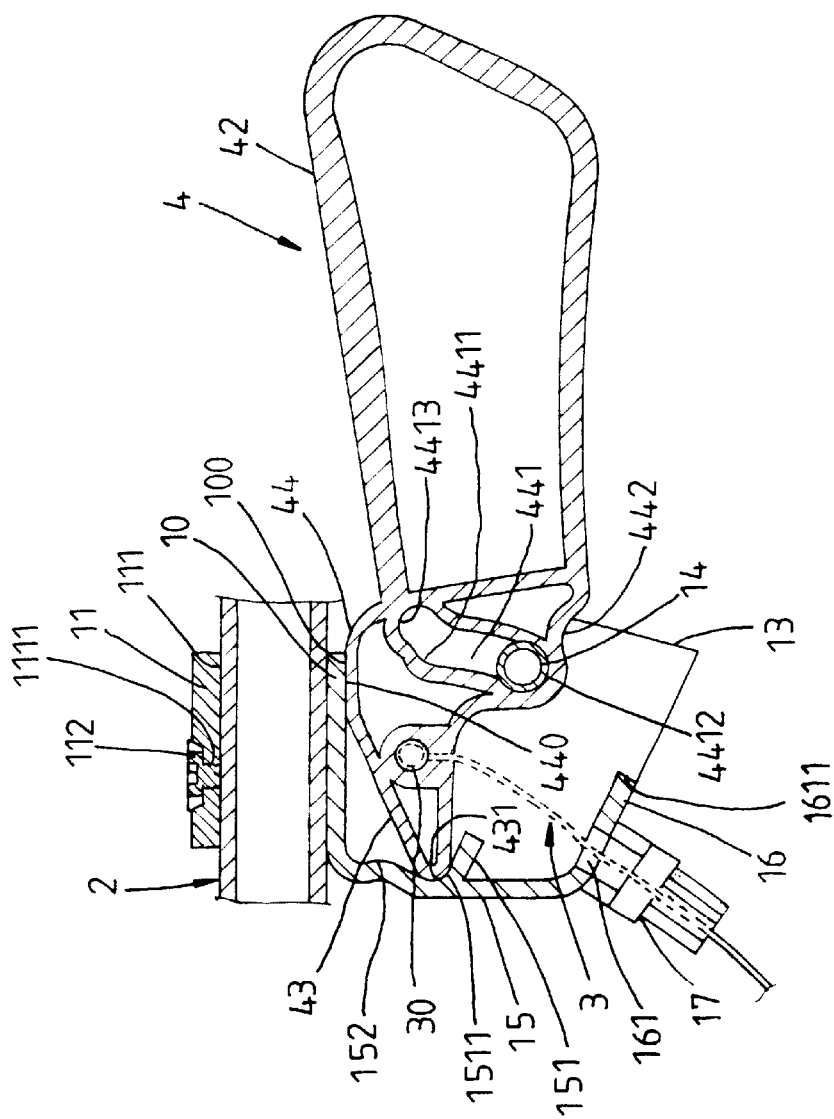
FIG. 8 is a sectional view of the present invention showing the brake lever turned to a third position in the mounting base frame.

Referring to FIGS. from 6 through 8 again, when the user turns the handhold portion 42 of the brake lever 4 downwards to pull up the brake cable 3, the second end 4413 of the elongated coupling slot 441 of the brake lever 4 is stopped at the pivot 14, the front side 431 of the wedge-shaped front protruding block 43 of the brake lever 4 is stopped at the recessed positioning portion 152 of the mounting base frame 1, and the recessed positioning portion 442 of the brake lever 4 is stopped at one side edge 1611 of the bottom wall 16, and therefore the brake lever 4 is maintained at the braking status (see FIG. 6). When the user turns the handhold portion 42 of the brake lever 4 upwards to disengage the second end 4413 of the elongated coupling slot 441 from the pivot 14 and to force the positioning groove 4411 into engagement with the pivot 14, the front side 431 of the wedge-shaped front protruding block 43 of the brake lever 4 is disengaged from the recessed positioning portion 152 of the mounting base frame 1 and moved to the stop face 1511 of the stop block 151 (see FIG. 7), and at this time the brake lever 4 is loosened. When the user turns the handhold portion 42 of the brake lever 4 continuously upwards to disengage the positioning groove 4411 of the brake lever 4 from the pivot 14 and to force the first end 4412 into engagement with the pivot 14, the front side 431 of the wedge-shaped front protruding block 43 of the brake lever 4 is maintained stopped at the stop face 1511 of the stop block 151, and top side 440 of the base block 44 of the brake lever 4 is stopped at the inner side 100 of the top wall 10 to pull up the brake cable 3 (see FIG. 8), holding the brake cable 3 in the braking position temporarily.

As indicated above, the elongated coupling slot 441 extends in direction from the top side of the base block 44 toward the bottom side thereof, and the wire hole 161 extends downwards through the bottom wall 16 of the mounting base frame 1 to guide the brake cable 3 downwards toward the wheel axle of the rear wheels of the wheeled walker (not shown). Therefore, when operating the handhold portion 42 of the brake lever 4, the brake cable 3 is positively smoothly pulled to stop the wheeled walker.

A prototype of wheeled walker brake lever mounting arrangement has been constructed with the features of FIGS. 3–8. The wheeled walker brake lever mounting arrangement functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A wheeled walker brake lever mounting arrangement comprising a mounting base frame fastened to one handlebar of a wheeled walker, said mounting base frame comprising a top wall, a front wall, a bottom wall, two sidewalls, a barrel integral with said top wall, a wire hole extended through said bottom wall, and a wire guide mounted in said wire hole, said barrel having an axially extended mounting hole, which receives the handlebar of the wheeled walker, and a transverse screw hole, which receives a tightening up screw that fixes said barrel to the handlebar of the wheeled walker, a brake lever pivoted to said mounting base frame between said sidewalls, said brake lever having a locating hole near a front side thereof and a backwardly extended handhold portion, and a brake cable inserted through said wire guide in said wire hole, said brake cable having one end terminating in an end rod, which is fastened to the locating hole of said brake lever, and an opposite end fastened to a rear wheel brake assembly of the wheeled walker;

wherein said mounting base frame further comprises a stop block inwardly protruded from an inner surface of said front wall and forming a stop face, a recessed positioning portion disposed on inside said mounting base frame between said front wall and said top wall, and two pivot holes respectively extended through said sidewalls in alignment with each other; said brake lever further comprises a base block, said base block having a front side, a top side, and a bottom side, a wedge-shaped front protruding block forwardly protruded from the front side of said base block, said wedge-shaped front protruding block having a rear side integral with said base block of said brake lever and a front side, a recessed positioning portion disposed at the bottom side of said base block, an elongated coupling slot through said base block, and a positioning groove transversely disposed in said elongated coupling slot at one side, said elongated coupling slot having a smoothly arched first end and a smoothly arched second end; a pivot is mounted in the pivot holes of said sidewalls of said mounting base frame and the elongated coupling slot of said brake lever; when the user turns said handhold portion of said brake lever downwards to pull up said brake cable, the second end of said elongated coupling slot of said brake lever is stopped at said pivot, the front side of said wedged-shaped front protruding block of said brake lever is stopped at the recessed positioning portion of said mounting face frame, and the recessed positioning portion of said brake lever is stopped at one side edge of the bottom wall of said mounting base frame, and the brake lever is maintained at the braking status; when the user turns the handhold portion of said brake lever upwards to disengage the second end of said elongated coupling slot from said pivot and to force said positioning groove into engagement with said pivot, the front side of said wedged-shaped front protruding block of said brake lever is disengaged from the recessed positioning portion of said mounting base frame and moved to the stop face of said stop block, and at this time said brake lever is loosened; when the user turns the handhold portion of said brake lever continuously upwards to disengage said positioning groove of said brake lever from said pivot and to force the first end of said elongated coupling slot into engagement with said pivot, the front side of said wedged-shaped front protruding block of said brake lever is maintained stopped at the stop face of said stop block, and the top side of said base block of said brake lever is stopped at an inner side of said top wall to pull up said brake cable, holding said brake cable in the braking position temporarily.

2. The wheeled walker brake lever mounting arrangement as claimed in claim 1, wherein said elongated coupling slot of said brake lever extends in direction from the top side of said base block toward the bottom side thereof; said wire hole extends downwards through the bottom wall of said mounting base frame to guide said brake cable downwards toward a wheel axle of rear wheels of the wheeled walker.

* * * * *